United States Patent [19]

Chemin et al.

[11] Patent Number: 4,825,052

[45] Date of Patent: Apr. 25, 1989

[54] METHOD AND APPARATUS FOR CERTIFYING SERVICES OBTAINED USING A PORTABLE CARRIER SUCH AS A MEMORY CARD

[75] Inventors: Francois Chemin, Plaisir; Michel Ugon, Maurepas, both of France

[73] Assignee: Bull CP8, Trappes, France

[21] Appl. No.: 947,882

[22] Filed: Dec. 30, 1986

[30] Foreign Application Priority Data

Dec. 31, 1985 [FR] France .............. 85 19502

[51] Int. Cl.$^4$ ............................................. G06F 15/30
[52] U.S. Cl. .................................... 235/380; 235/379; 235/492
[58] Field of Search ............... 235/379, 380, 381, 492, 235/352, 352.5, 985

[56] References Cited

U.S. PATENT DOCUMENTS

| | | | |
|---|---|---|---|
| 4,375,032 | 2/1983 | Uchida | 235/381 X |
| 4,449,040 | 5/1984 | Matsuoka et al. | 235/381 X |
| 4,471,216 | 9/1984 | Herve | 235/380 |
| 4,484,067 | 11/1984 | Obrecht | 235/381 X |
| 4,510,382 | 4/1985 | Walter | 235/381 X |
| 4,518,852 | 5/1985 | Stockburger et al. | 235/381 |
| 4,529,870 | 7/1985 | Chaum | 235/381 X |
| 4,544,833 | 10/1985 | Ugon | 235/492 X |
| 4,549,075 | 10/1985 | Saada et al. | 235/380 |
| 4,672,182 | 6/1987 | Hirokawa | 235/492 X |
| 4,684,791 | 8/1987 | Bito | 235/492 X |

FOREIGN PATENT DOCUMENTS

| | | |
|---|---|---|
| 6498 | 1/1980 | European Pat. Off. . |
| 32193 | 7/1981 | European Pat. Off. . |
| 100260 | 2/1984 | European Pat. Off. . |
| 161181 | 11/1985 | European Pat. Off. . |
| 2526977 | 5/1982 | France . |

OTHER PUBLICATIONS

"Smart Cards", Davies, D. W., International Conference on Secure Communications Systems, Feb. 22-23, 1984.

Primary Examiner—M. H. Paschall
Assistant Examiner—A. Jonathan Wysocki
Attorney, Agent, or Firm—Kerkam, Stowell, Kondracki & Clarke

[57] ABSTRACT

A method and apparatus for certifying services obtained with the aid of a portable carrier such as a memory card. A portable carrier (2) such as a credit card is adapted to be connected to an apparatus (1) that calculates a visual record or certificate (C), composed of a result (R) and parameters (PI, PE) necessary for calculating the result. This result is calculated by processing circuits (T2) in the card (2) under the control of a program (P2) recorded in its memory (M2) and of a secret key (S). The result emitted after a service has been furnished can then be recalculated, to certify that the service has been furnished.

20 Claims, 2 Drawing Sheets

METHOD AND APPARATUS FOR CERTIFYING SERVICES OBTAINED USING A PORTABLE CARRIER SUCH AS A MEMORY CARDr

FIELD OF THE INVENTION

The subject invention relates to a method and an apparatus for certifying services obtained with the aid of a portable carrier, such as a memory card.

BACKGROUND OF THE INVENTION

Although the magnetic card is widely used as a means of furnishing services, purveyors of these services are made uneasy by the increasing fraud in connection with services furnished because of stolen or counterfeit cards.

The disadvantages of magnetic cards will be better understood from a brief review of the manner in which a service is provided with a card with a magnetic track, taking a payment card as an example.

First, proof that a transaction has taken place between a customer and a vendor takes the material form of an acknowledgement or receipt, on which the following information, in particular, is written: the amount of the transaction and information that identifies the customer (name, account number, etc.), picked up directly from the card (using the magnetic track and/or information embossed on it), and information identifying the vendor. After signature by the customer, the duplicate of the receipt is given to the customer as proof, and the original is transmitted by the vendor to its bank.

Second, the bank commences a series of operations, based on the information written on the receipt, to debit the customer's account by the amount of the transaction and credit the vendor's account by the same amount. Once the debiting and crediting operations have been completed, the transaction is validated.

From the above description of a transaction, two statements can be made:

1. The vendor has no means whatever at its disposal for detecting a stolen or counterfeit card at the moment when the transaction is made, and
2. the bank has no means whatever at its disposal for proving, simply by examining a receipt sent by a vendor, that the corresponding transaction has been made using a stolen or counterfeit card.

Thus in the majority of cases, a fraudulent transaction cannot be detected except by the customer, either after discovering his card has been stolen or after his account has been debited for the amount of a transaction he never made. The bank will then open an inquiry, but the results of that are never available immediately.

Meanwhile, to reduce the number of fraudulent transactions, the vendor can, as a control, verify that the name embossed on the card is the same one written on some other piece of identity presented by the customer. This kind of control does dissuade those committing petty fraud, but not experienced swindlers. A second control is to verify that the number embossed on the card is not included on a blacklist regularly updated by banking entities. These controls are not effective for a card that has not yet been reported stolen or for a counterfeit card that has not yet been detected.

A solution to this problem is to have all the operations, from the request for a service to the furnishing of the service, to be monitored, verified and executed all at once. But, such a solution requires relatively expensive equipment.

OBJECT AND SUMMARY OF THE INVENTION

By way of contrast, it is the object of the present invention to provide an intermediate solution, where the control and verification operations are performed at the moment the service is furnished, with sufficient guarantees to the purveyor of the services, and where they can be completed later after the service has been furnished, to certify that the service has been furnished under proper conditions, both for the customer and for the purveyor. The necessary equipment is furthermore limited to a simple apparatus, which is neither bulky nor expensive and is advantageously portable.

The invention proposes a method for certifying a service furnished with the aid of a portable carrier such as a memory card coupled to a first apparatus, characterized in that it comprises using the apparatus to prepare a certificate comprising at least two data, the first being a result calculated by the processing circuits based on parameters that are internal and/or external to the card and on a secret key, and the second being the aforementioned internal and/or external parameters that were necessary for calculating the result, and recording this certificate on a carrier as a means of proof that the service was furnished, and in that it comprises, in a second step, recalculating, by the processing circuits of a second apparatus, a result based on the internal and/or external parameters of the certificate and on a secret key, and comparing this result with the result of the certificate to certify that the service was in fact provided with the aid of a card issued for obtaining this service.

In another feature of the invention, the result of the certificate is calculated in a first step by the processing circuits of the card, and the secret key is prerecorded in the memory of the card to prevent calculating a plausible result in advance.

In still another feature of the invention, the result of the certificate takes into account a variable parameter that is internal to the card, so that two identical results will never be obtained for the same card.

In another feature of the invention, the certificate furnished in the first step is recorded either on a carrier made of paper, such as a receipt, or on a magnetic or electronic carrier.

Further advantages, characteristics and details of the invention will become apparent from the explanatory description that follows, taken in conjunction with the appended drawings provided by way of example.

DESCRIPTION OF THE PREFERRED EMBODIMENT

The example hereinafter described is an illustration of the method according to the invention, in a payment application; however, the principle of the invention remains valid no matter what kind of service is furnished.

Figure 1:
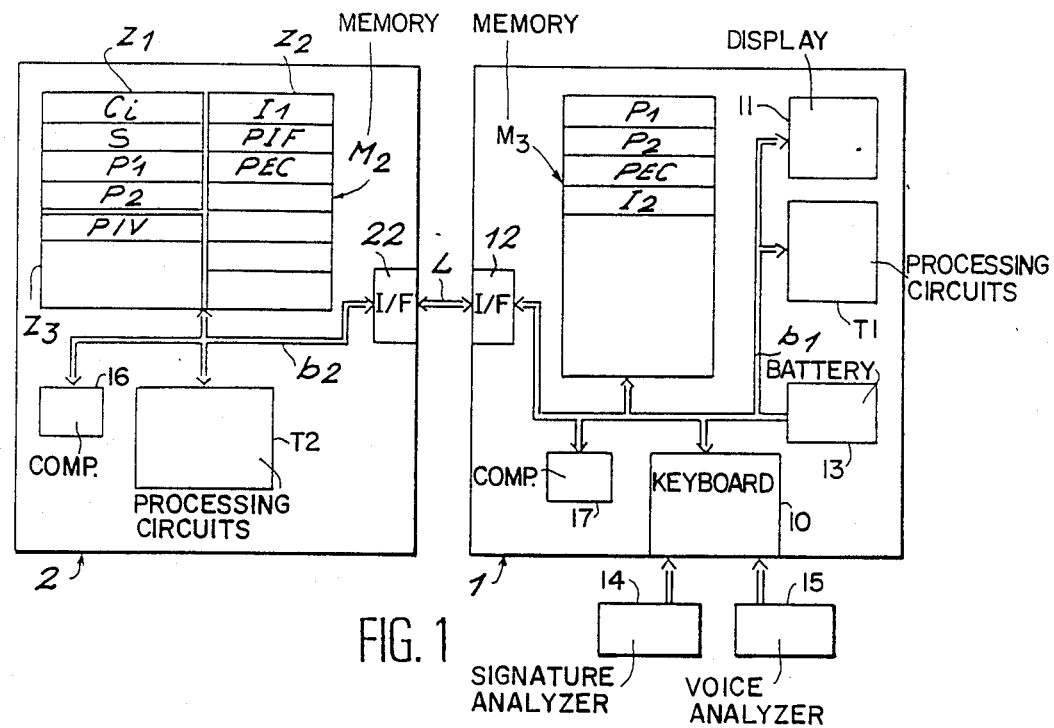
FIG. 1 is a schematic representation of an apparatus for performing the method according to the invention.

Referring now to FIG. 1, the apparatus 1 includes the following: a data entry device 10, for example comprising a keyboard, a memory M1, processing circuits T1 such as a typical microprocessor, and a display unit 11, for example comprising light-emitting diodes.

All the circuits are connected to one another by a linking bus b1, which carries control, address, and data signals.

This apparatus 1 is intended to receive a removable portable article 2, such as a memory card including a memory M2 and processing circuits T2 connected via a linking bus b2. Such a card is described in particular in French Pat. Nos. 2 401 459 and 2 461 301 (corresponding to U.S. Pat. Nos. 4,211,919 and 4,382,279, respectively) assigned to the assignee of the subject invention.

The memory M2 of the card 2 includes at least three memory zones Z1, Z2, Z3. The memory zone Z1 is inaccessible to writing and reading from outside, and the memory zones Z2, Z3 are inacessible except for reading from the outside.

Coupling of the card 2 to the apparatus 1 is done via two interfaces I/F 22, 12 that are connected to one another by an electrical connection L. By way of example, these two interfaces are of the type described in the French patent of the assignee of the subject invention, published as French Pat. No. 2 490 367 (corresponding to U.S. patent application Ser. No. 302,595, filed Sept. 15, 1981, now abandoned). The interface 12 of the apparatus 1 may advantageously be equipped with the connector such as that described in the French patent of the assignee of the subject invention, published as French Pat. No. 2 445 560, (corresponding to U.S. Pat. Nos. 4,443,049 and 4,449,775) so as to enable the card 2 to be coupled in a removable manner with the apparatus 1. Finally, the dialogue or data transmission mode between the card 2 and the apparatus 1 may advantageously be that described in French Pat. No. 2 483 713 (corresponding to U.S. Pat. No. 4,556,958) of the assignee of the present invention.

The subject matter of the aforenoted patents and publications are hereby incorporated by reference.

The apparatus 1 is supplied with power either from the mains or by an autonomous battery 13 incorporated into the apparatus. It may advantageously be embodied in a portable manner, because the circuits it contains take up so little space.

The method according to the invention will now be described in terms of this apparatus 1.

Generally, the apparatus used for putting a transaction into material form and which is at the disposal of the vendor will fulfill three main functions:

the first function is to authenticate the card presented by the customer, to enable the vendor to detect a counterfeit card;

the second function is to identify the customer, by monitoring a code assigned to the customer and entered into the apparatus, to enable the vendor to detect a stolen card; and finally, the third function is to calculate a result based on internal and/or external parameters of the card.

Then, the vendor makes, or has made, a means of proof of the transaction on a carrier of some kind (paper, electronic or magnetic) which in addition to data specific to the transaction will also carry a datum, called a certificate, comprising the aforementioned result and the parameters necessary for calculating it.

Generally, the apparatus used to validate a transaction and placed at the disposal of the banking entity will fulfill one main function, based on a carrier serving as a means of proof and provided or forwarded by a vendor or a customer. This function comprises recalculating the result of the certificate based on the aforementioned parameters on the carrier, and verifying that this result is indeed equal to that written on the carrier. This kind of control enables the detection of counterfeit carriers made by a defrauding vendor, or the detection of a correct carrier that is nevertheless presented for cashing by some vendor other than the one who originally issued the carrier.

The payment of the amount of the transaction is done in two steps.

The first step is performed by the vendor and has seven successive phases:

Phase 1

The customer, upon request by the vendor, inserts his card 2 into the apparatus 1. If the card 2 is positioned correctly, it trips the appropriate switch or circuit to cause a voltage to be supplied to the apparatus 1.

Phase 2

The apparatus 1 performs a control of the customer's card 2. More precisely, the apparatus 1 will pick up a datum I1 in the memory zone Z2 of the card 2 at a predetermined address. This datum I1 enables verification of the status of the card; that is, it indicates whether previous use of the card has occasioned some prohibition, or whether the period of card validity has expired, and so forth.

Phase 3

The apparatus 1 will authenticate the card 2, or in other words verify whether or not it is in the presence of a counterfeit card.

To do so, the apparatus 1 picks up a datum I2 in its memory M1 and encodes this information prior to sending it to the card 2. The encoding is done via the processing circuits T1 of the apparatus, which apply to the datum I2 a public function with a public key of an algorithm with a public key translated by a program P1 recorded in its memory M1.

This kind of algorithm is such that knowledge of the public function does not enable deducing the inverse secret key function. The inverse secret key function is recorded in the form of a program P'1 in the memory zone Z1 of the card 2.

An encoded datum, that is, the datum I2 after its encoding by the apparatus 1, is transmitted to the card 2 and decoded by it via the processing circuits T2 by executing the program P'1.

The datum decoded by the card 2 is transmitted to the apparatus 1, which compares it with the original datum I2. If the two do not agree, then the apparatus 1 has detected a counterfeit card.

For security reasons, the encoded datum is variable. To this end, the apparatus 1 takes into account a variable datum I2, for example comprising a random number.

Alternatively, the public key algorithm could be used in a different way. The apparatus 1 sends a variable non-coded datum I2 (a random number, for example) to the card 2. The card 2 encodes this datum I2 by the program P'1, and the resulting datum is decoded by the program P1 of the apparatus 1.

Phase 4

The apparatus 1 identifies the person carrying the card 2 after this person has entered into the apparatus 1 a datum assigned to him and recorded earlier in the memory M2 of the card 2.

This datum is generally a confidential code Ce entered with the keyboard 10, and it is compared by the card 2 with a confidential code Ci prerecorded in the memory zone Z1 of the card 2.

If identity does not exist between the two codes, or the two codes Ci, Ce do not have a predetermined relationship, the apparatus 1 signals by some suitable means that the person is in possession of a stolen card, or that the person has made an error in entering his confidential code. In the latter case, the person can begin the operation again, but after three attempts, the card 2 generally invalidates itself and becomes unusable, by assuming a predetermined status represented by the datum I1 written into the memory zone Z2. It is this status that is controlled in the course of phase 2 above.

The confidential code Ce entered into the apparatus 1 and assigned to the person carrying the card 2 may be replaced by some other datum, such as:

a numerical code which reflects the signature of the person and is made by a signature analyzer 14 connected to the apparatus 1; or a numerical code which reflects the voice of the person, made by a voice analyzer 15 connected to the apparatus.

Phase 5

The customer's card 2 calculates a result R with a view to making a certificate C.

The certificate C comprises two data:

a first datum, which is the result R of the calculation performed by the card 2 based on internal parameters prerecorded in the card 2 and/or external parameters entered into the apparatus 1;

and a second datum, which comprises internal parameters PI and/or external parameters PE necessary for calculating the result R, and which will then be used by the banking entity to recalculate the value of the result R of the certificate C.

By way of example, the internal parameters PI used by the card 2 to calculate the result R of the certificate C are the following:

a fixed parameter PIF assigned to the card, for example its serial number inscribed in the memory Z2 when the card 2 is manufactured;

and a variable parameter PIV, such as the datum that reflects the status of the card after each use, this status of the card 2 being recorded in the control memory zone Z3, and upon each transaction or use of the card, at least one bit of this memory zone is modified internally by the processing circuits T2 of the card.

By way of example, the external parameters PE communicated to the card 2 for calculating the result R of the certificate C are as follows:

a random datum PEA;

and a datum PEC assigned to the vendor, which is prerecorded in the memory 1 of the apparatus M1.

The calculation of the result R is done by the processing circuits T2 of the card 2 in accordance with a program P2 precorded in the memory zone Z1 of the card that is not accessible from the outside, to keep it secret.

In a preferred mode for calculating the result R, the program P2 takes into account at least one variable parameter for each calculation, so that two results R will never be identical, in particular for the various results calculated by the same card. This variable parameter may advantageously be the internal parameter PIV of the card that reflects the status of the card and is mofified each time it is used.

The use of this variable parameter PIV prevents the possibility that a defrauder may be able to reuse a result R that could be recognized as valid, even though based on a fraudulent transaction.

To increase security, the program P2 for calculating the result R also takes into account a secret key S, prerecorded into the memory zone Z1 of the card, to prevent a defrauder from being able to calculate a result R in advance.

By way of example, the result R is calculated on the basis of: the variable internal parameter PIV that specifies the status of the card; the internal parameter corresponding to the serial number of the card, or any other parameter assigned to the card, so that two cards having the same status at a given instant can calculate two different results; an external parameter PEC assigned to the vendor so as to personalize the result R, to prevent a vendor from using for his own benefit a result R calculated in the course of a transaction performed for some other vendor; and a secret key S.

In conclusion, the certificate C causes the following to become visible:

the result R previously calculated, and all the parameters PI, PE, except for the secret key S, that were used in calculating the result R.

It is important to note that a certificate C is not absolutely confidential, and that two certificates C are never identical.

By way of example, the program P2 that enables calculation of the result R of a certificate may be an algorithm for reversible and public encoding, such as the algorithm known by the name "DES".

Phase 6

Figure 2:
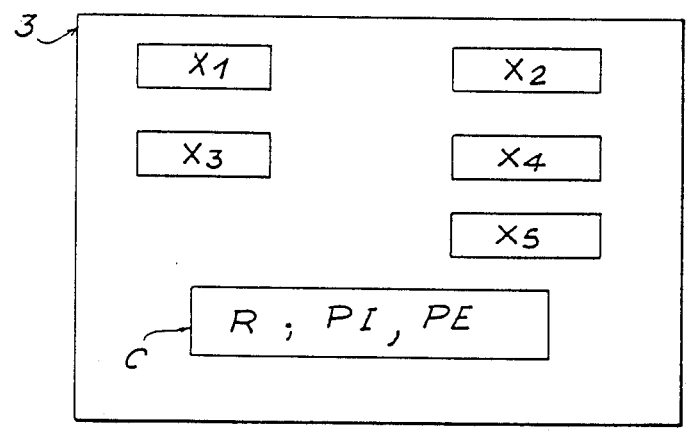
FIG. 2 shows an example of the certificate furnished by a purveyor after a service has been furnished.

The vendor furnishes proof of the transaction by way of a carrier, such as a piece of paper or receipt 3, on which the following information, in particular, is written, referring to FIG. 2:

the amount X1 of the transaction;

the date X2 of the transaction;

the ordinal number X3 of the receipt, the identity X4 of the customer (name, banking entity and number of account to be debited) picked up from the card;

the identity X5 to the vendor (name, banking entity and number of account to be credited;

and the certificate C comprising a result R and the parameters PI, PE necessary for calculating it.

The certificate C, once it has been calculated, is displayed on a unit 11 of the apparatus 1, and the vendor copies this onto the receipt 3. However, it may be provided that the certificate C is posted automatically on the receipt 3.

Phase 7, the final phase

The status of the card is modified in the memory zone Z3 by the processing circuits T2, and the card 2 is taken back out of the apparatus 1, thereby terminating the supply of voltage to it.

The second step is performed in a single phase, on the part of the banking entity.

The receipt 3 thus made is then sent by the vendor to its banking entity, which has an apparatus 1 similar to that of the vendor and also has a control card similar to the customer card 2, which is coupled to the apparatus 1 for recalculation of the result R of the certificate, based on the parameters posted on the receipt 3. Once the control card, which is similar to the customer card 2, is coupled with the apparatus 1, an operator, via a keyboard 10 of the apparatus 1, enters the value of the certificate C as it is posted on the receipt 3 and comprising the result R and parameters PI, PE that were used to calculate it. This value is recorded in the memory M1 of the apparatus 1, and the parameters of the certificate C are transmitted to the control card.

The control card similar to customer card 2 contains the same program P2 for calculating the result as the program P2 contained in the customer card 2 and also the same key as the secret key S of the customer card 2. The processing circuits of this control card, which are the same as the circuits T2 of the customer card 2, calculate a result R, and the control card or the apparatus 1 verifies that this result does in fact agree with that of the receipt 3. If it does not agree, the banking entity will have detected a false receipt 3 based on a fraudulent transaction. This verification is done by a comparator circuit of the control card which is the same as the comparator circuit 16 of the customer card 2, or by a comparator circuit 17 of the apparatus 1.

Furthermore, the customer or the vendor can always have a transaction verified by presenting the duplicate of the receipt to the banking entity, which can immediately monitor the validity of the receipt by recalculating the result of the certificate.

Figure 3:
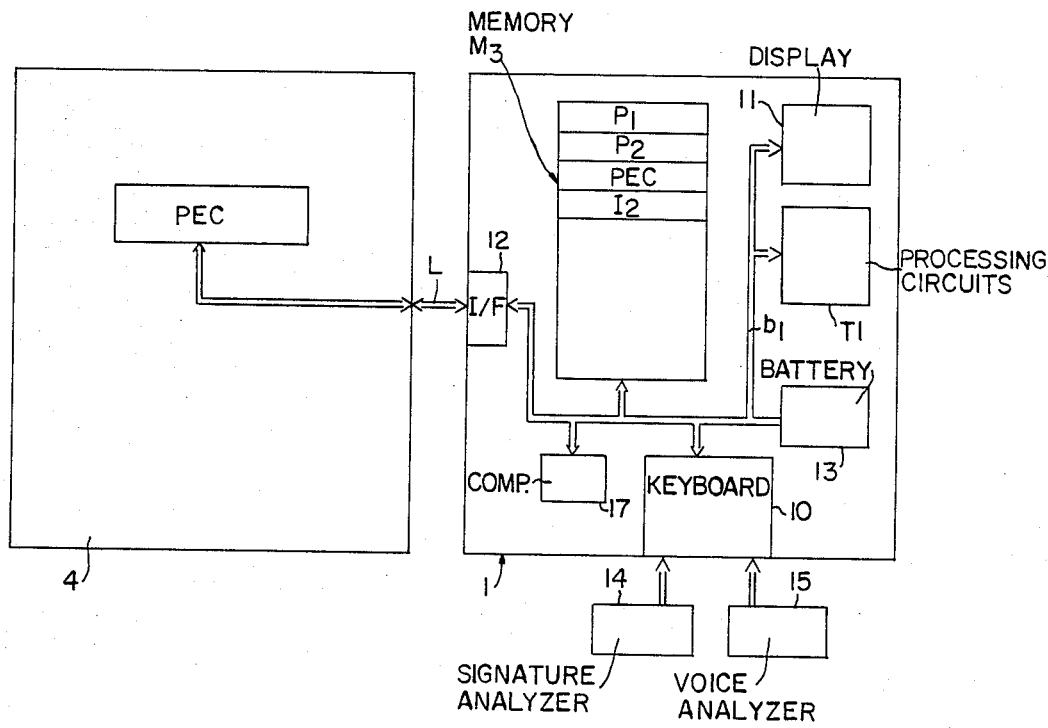
FIG. 3 is a schematic representation similar to FIG. 1 illustrating a further aspect of the invention for supplying a parameter to the apparatus.

In another feature of the method according to the invention as shown in FIG. 3, when the calculation of the result R of the certificate C takes into account an external parameter assigned to the vendor, this parameter PEC is not entered by the vendor. More precisely, the vendor has a card 4 similar to the previous card 2, and which contains this parameter. For the apparatus 1 to be able to function, an initializing operation must be performed, which comprises coupling the card 4 with the apparatus 1, having the apparatus 1 pick up the parameter in the card 4 assigned to the vendor, and storing this parameter PEC in the memory M1 of the apparatus 1.

In the phase when it is used for calculating a certificate, the apparatus 1 will transmit this parameter PEC directly to the customer's card 2.

Preferably this initializing step is not done simply once and for all, nor prior to each transaction, but it must be repeated systematically, for example whenever the battery 13 of the apparatus is empty, whenever the apparatus has been in operation for a predetermined time, or whenever the apparatus has performed a given number of transactions.

This greatly reduces the possible incentive to steal such an apparatus.

In the above example, the certificate C is posted on a carrier (receipt) made of paper, which serves as a means of proof, but the principle of the invention remains valid if the carrier is electronic (memory) or magnetic (tape). In that case, the certificate C is recorded on the electronic or magnetic carrier at the end of the first step, and then the contents of this carrier are removed, for example daily or after every n transactions, and transmitted to a central system for certification (second step).

What is claimed is:

1. A method of certifying a service furnished with the aid of a portable card which is coupled to an apparatus, the card having a memory (M2) and processing circuits (T2), the method comprising calculating in the processing circuits of the card a first result (R) based upon an internal parameter (PI) prerecorded in the memory of the card and/or upon an external parameter (PE) and upon a secret key (S); preparing a certificate (C) comprising at least first and second data, the first datum being the first result (R) calculated by the processing circuits (T2) and the second datum being the internal and/or external parameters (PI, PE) used for calculating the result (R); recording the certificate (C) on a carrier (3) as proof that the service was furnished; recalculating in second processing circuit (T2) a second result (R) based upon the second datum recorded on the certificate and upon another secret key (S) corresponding to the first-mentioned secret key, comparing the second result with the first result recorded on the certificate, and certifying, upon the first and second results matching, that the service was properly obtained with the portable card.

2. A method as defined by claim 1, wherein said calculating the result (R) of the certificate (C), the calculation takes into account a variable internal parameter (PIV).

3. A method as defined by claims 1 or 2, wherein said calculating comprises taking into account a fixed internal parameter (PIF) belonging to the card in calculating the result (R) of the certificate (C).

4. A method as defined by claims 1 or 2, wherein said calculating comprises taking into account an external parameter (PEC) transmitted to the card (2) in calculating the result (R) of the certificate (C).

5. A method as defined by claim 3, wherein said calculating further comprises taking into account an external parameter (PEC) transmitted to the card (2) in calculating the result (R) of the certificate (C).

6. A method as defined by claims 1 or 2 wherein said calculating comprises taking into account a random external parameter (PEA) transmitted to the card (2) in calculating the result (R) of the certificate (C).

7. A method as defined by claim 3, wherein said calculating comprises taking into account a random external parameter (PEA) transmitted to the card (2) in calculating the result (R) of the certificate (C).

8. A method as defined by claim 4, wherein said calculating comprises taking into account a random external parameter (PEA) transmitted to the card 92) in calculating the result (R) of the certificate (C).

9. A method as defined by claim 5, wherein said calculating comprises taking into account a random external parameter (PEA) transmitted to the card (2) in calculating the result (R) of the certificate (C).

10. A method as defined by claim 4 further comprising supplying the external parameter (PEC) from a second card (4) similar to the first-mentioned card (2).

11. A method as defined by claim 5 further comprising supplying the external parameter (PEC) from a second card (4) similar to the first-mentioned card (2).

12. A method as defined by claims 1 or 2 further comprising displaying the result (R) of the certificate (C) on a display unit (11) and retranscribing the result on the carrier (3).

13. A method as defined by claims 1 or 2 further comprising automatically posting on the carrier (3) the first result (R) of the certificate (C) calculated by the card (2).

14. A method as defined by claims 1 or 2 wherein said recording comprises recording the certificate (C) on an electronic or magnetic carrier.

15. A method as defined by claims 1 or 2 further comprising verifying the authenticity of the card (2) by picking up in the card (2) a first datum (I2) that is not in code and a second datum that is an encoded first datum obtained by an encoding algorithm, applying an inverse decoding function to the encoded second datum to retrieve a non-encoded datum, and verifying that this retrieved non-encoded datum is identical to the non-encoded first datum picked up in the card (2).

16. A method as defined by claim 15, wherein the encoding algorithm is the inverse function of the secret key of an algorithm having a public key, and the encoding algorithm is a public function with a public key of the algorithm type.

17. A method as defined by claim 1, wherein the first-mentioned secret key is stored in the memory of said portable card, and wherein said other secret key is stored in a second control card.

18. An apparatus (1) certifying a service furnished with the aid of a portable memory card, the apparatus comprising a first memory (M1), first processing circuit means (T1), and a coupling circuit (12) for removably receiving the portable card (2), said card 92) comprising a second memory (M2) and second processing circuit means (T2) for calculating a result (R) based on a program (P2) recorded in the second memory (M2), and which takes into account internal parameters (PI) recorded in the second memory (M2) and/or external parameters (PE) entered into the card (2), said result being unique for each service furnished with the card (2).

19. An apparatus as defined by claim 18 wherein the first memory (M1) contains an external parameter (PEC) belonging to a vendor entity, the external parameter being taken into account by the program in the card for calculating the result (R).

20. An apparatus as defined by claim 19 wherein the parameter (PEC) is supplied from another card assigned to a vendor of the service and which is coupled to said apparatus (1).

* * * * *

UNITED STATES PATENT AND TRADEMARK OFFICE
CERTIFICATE OF CORRECTION

PATENT NO. : 4,825,052
DATED : April 25, 1989
INVENTOR(S) : CHEMIN

It is certified that error appears in the above-identified patent and that said Letters Patent is hereby corrected as shown below:

In Col. 8, line 16, 17, (Claim 2), delete "the calculation takes" and insert --comprises taking--.

In Col. 8, line 41, (Claim 8), "92)" should be --(2)--.

In Col. 9, line 18, (Claim 18), "92)" should be --(2)--.

In Col. 10, line 9, (Claim 19), "18" should be --16--.

Signed and Sealed this

Eighth Day of May, 1990

Attest:

HARRY F. MANBECK, JR.

Attesting Officer

Commissioner of Patents and Trademarks